(12) United States Patent
Gibson et al.

(10) Patent No.: US 9,081,140 B2
(45) Date of Patent: Jul. 14, 2015

(54) LUMINESCENCE-BASED REFLECTIVE PIXEL

(75) Inventors: Gary Gibson, Palo Alto, CA (US); Xia Sheng, Palo Alto, CA (US); Patricia A. Beck, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 289 days.

(21) Appl. No.: 13/643,057

(22) PCT Filed: Apr. 22, 2010

(86) PCT No.: PCT/US2010/031975
§ 371 (c)(1),
(2), (4) Date: Oct. 23, 2012

(87) PCT Pub. No.: WO2011/133152
PCT Pub. Date: Oct. 27, 2011

(65) Prior Publication Data
US 2013/0038919 A1    Feb. 14, 2013

(51) Int. Cl.
*G02B 5/02*     (2006.01)
*G02B 5/20*     (2006.01)
(Continued)

(52) U.S. Cl.
CPC ............... *G02B 5/201* (2013.01); *G02B 5/223* (2013.01); *G02B 5/26* (2013.01); *G02F 1/167* (2013.01); *G02F 2201/34* (2013.01); *G02F 2202/046* (2013.01)

(58) Field of Classification Search
CPC .......... G02B 5/201; G02B 2/223; G02B 5/26; G02B 6/0033; G02F 1/167; G02F 2201/34; G02F 2202/046

USPC .................................. 359/229, 599; 362/603
See application file for complete search history.

(56) References Cited

U.S. PATENT DOCUMENTS 8,867,117  B2   10/2014  Gibson
2004/0095658 A1  5/2004  Buretea et al.
(Continued)

FOREIGN PATENT DOCUMENTS

CN     102576163 A    7/2012
JP     2009-080261 A  4/2009
WO     WO-2006-088369 A2  8/2006

OTHER PUBLICATIONS

International Search Report and Written Opinion of the International Searching Authority, mailed Dec. 28, 2010, issued in related PCT Application No. PCTIUS2010/031975.
(Continued)

*Primary Examiner* — Euncha Cherry
(74) *Attorney, Agent, or Firm* — Thomas, Kayden, Horstemeyer & Risley, LLP

(57) ABSTRACT

Disclosed herein are various embodiments related to luminescence-based reflective display pixels. In one embodiment, among others, a luminescent-based pixel includes a luminescent layer including luminophores distributed in a matrix. The luminescent layer is configured to receive light from an ambient environment through a first side of the luminescent layer and has an index of refraction that is higher than an index of refraction of the ambient environment. The luminescent-based pixel includes a mirror disposed on a second side of the luminescent layer that is opposite the first side of the luminescent layer. The luminescent-based pixel also includes a diffusive surface to randomize the direction of incident light.

20 Claims, 6 Drawing Sheets

(51) Int. Cl.
*G02B 5/22* (2006.01)
*G02B 5/26* (2006.01)
*G02F 1/167* (2006.01)

(56) References Cited

U.S. PATENT DOCUMENTS

2008/0223438 A1  9/2008 Xiang et al.
2013/0208500 A1* 8/2013 Gibson .................. 362/603

OTHER PUBLICATIONS

Extended European Search Report and Search Opinion, European Patent Office, Oct. 9, 2013. Hewlett-Packard Development Company, L.P., EP Patent Application No. 108503743.9.

Gibson, Gary A., et al. "Luminescent enhancement of reflective displays." 2010 23rd Annual Meeting of the IEEE Photonics Society Conference Proceedings. 2010.

* cited by examiner

LUMINESCENCE-BASED REFLECTIVE PIXEL

BACKGROUND

A reflective display is a non-emissive device in which ambient light is used for viewing the displayed information. Rather than modulating light from an internal source, desired portions of the incident ambient light spectrum are reflected from the display back to a viewer. Electronic paper (e-paper) technologies have evolved to provide single layer monochromatic displays that control the reflection of ambient light.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
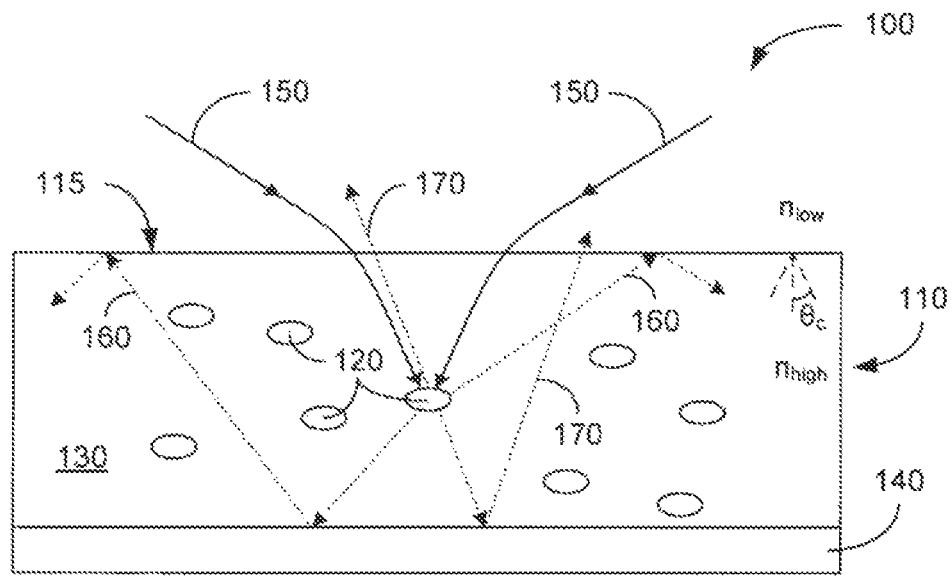
FIGS. 1-5 are graphical representations of luminescence-based reflective pixels (or subpixels) in accordance with various embodiments of the present disclosure.

Disclosed herein are various embodiments related to luminescence-based reflective display pixels. Reference will now be made in detail to the description of the embodiments as illustrated in the drawings, wherein like reference numbers indicate like parts throughout the several views.

It is desirable for paper-like displays to provide a bright, full color gamut. Existing reflective pixel technologies provide limited lightness, in part, because they simply return light in a desired optical band while absorbing light in other portions of the visible spectrum. The use of luminescent materials can boost the performance of 'paper-like' displays by strongly absorbing light over a broad range of wavelengths shorter than a threshold wavelength and re-emitting a large fraction of the absorbed energy in a desired wavelength band. This 'recycling' of otherwise wasted light enables greater lightness and, if the emission band is narrow, better color saturation.

A pixel can include a single pixel element or a plurality of subpixels, each of which modulates the light returned in a given spectral band. For example, a pixel may include three subpixels in a side-by-side arrangement for modulating three primary colors (e.g., red-green-blue or cyan-yellow-magenta) and an optional subpixel for modulation of white light. Other color choices and different numbers of pixels may be utilized.

FIG. 1 is a graphical representation of a luminescence-based reflective pixel (or subpixel) 100 in accordance with one embodiment of the present disclosure. In the embodiment of FIG. 1, a luminescent layer 110 that includes luminophores 120 for a selected color. Generally, a luminophore 120 is an atom or atomic grouping in a chemical compound that manifests luminescence. The luminophores 120 are distributed in a matrix 130, which may be a solid film or a liquid dispersion in the luminescent layer 110. Luminophores 120 include, but are not limited to, organic and inorganic dyes and phosphors, semiconducting nanoparticles, and pigment particles containing luminescent dye molecules, oligomers, or polymers. If the luminophores 120 are embedded in a solid or liquid matrix 130, the matrix material may be substantially transparent at wavelengths that are to be absorbed or emitted by the luminophores 120.

Alternatively, the matrix material may serve as an absorber, or sensitizer, that absorbs desired wavelengths of incident light and then transfers the absorbed energy to luminophores that will subsequently re-emit this energy at desired longer wavelengths. This energy transfer can be accomplished through non-radiative energy transfer processes such as Forster exchange or via radiation and re-absorption. Yet another alternative is to use multiple luminophores within a transparent matrix, each of which absorbs in different, but potentially overlapping, wavelength bands. In this case, one luminophore may act as an absorber, or sensitizer, that absorbs energy in a particular wavelength band and then transfers it to another luminophore. Below (or behind) the luminescent layer 110 may be a mirror 140. In some embodiments, the mirror 140 may be wavelength selective by reflecting only a selected portion of the optical spectrum. For example, a Bragg stack or a broadband mirror combined with a color filter may be utilized. In some embodiments, the reflection bandwidth may be chosen to reflect the primary color of the pixel (or subpixel), while not reflecting other primary colors.

Ambient light 150, that is incident on the pixel 100, will be collimated somewhat as it passes from a region with a lower index of refraction, $n_{low}$ (e.g., air), to a region with a higher index of refraction, $n_{high}$, that includes the luminophores 120. However, ambient light 150 absorbed by the luminophores 120 may be reradiated over a wide range of angles in a wavelength band around the desired optical band. Emitted light 160 approaching an interface to the region with the lower index of refraction ($n_{low}$) will be totally internally reflected if its angle of incidence is more than the critical angle, $\theta_c = \arcsin(n_{high}/n_{low})$, while emitted light 170 at less than the critical angle ($\theta_c$) will pass into the region with the lower index. The result is that a large fraction of the emitted light 160 will be coupled into waveguide modes within the high index region(s), e.g. the luminescent layer 110, of the device and eventually absorbed, even if the absorption coefficient for the emitted wavelengths is fairly low within the high index region(s) of the device. In order to maximize the out-coupling of the emitted light, it is desirable to make the index of refraction as low as possible in the region where the emission occurs. In some embodiments, an index of refraction in the range of about 1.2 to about 1.5 may be utilized for the emissive region to maximize the light coupled out of this region.

Figure 2:
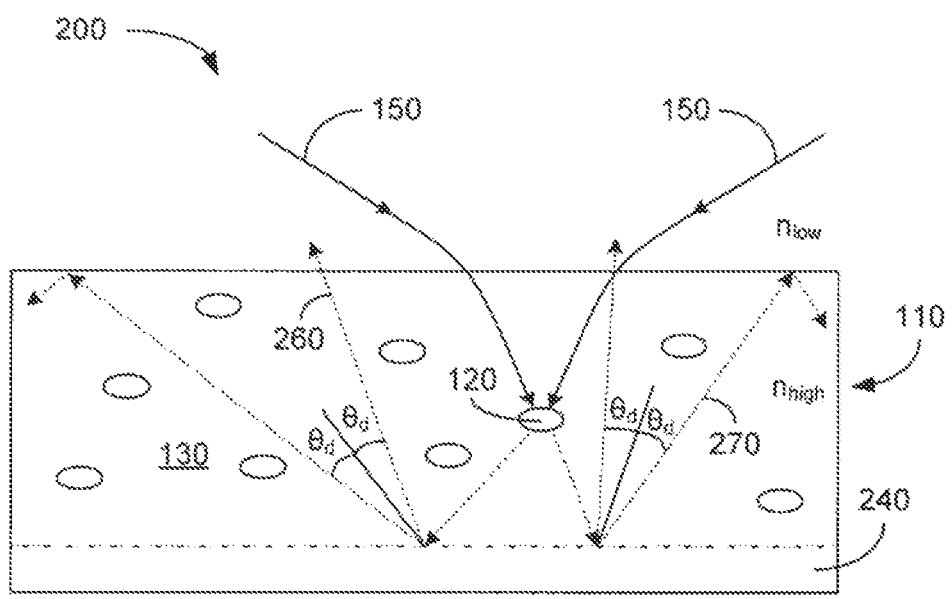

In some embodiments, the top surface 115 of the luminescent layer 110 can be textured (or diffusive) to help randomize the direction of internally reflected light and to broaden the range of available escape angles. Alternatively, a diffusive mirror may be used to randomize the direction of propagation of the emitted light each time it is reflected by the mirror. FIG. 2 is a graphical representation of a luminescence-based reflective pixel (or subpixel) 200 including a diffusive mirror 240 in accordance with an embodiment of the present disclosure. Diffusive mirrors 240 can be made that scatter the reflected light within a desired characteristic angular range. In the exemplary embodiment of FIG. 2, this angular scattering range is indicated by the half-angle $\theta_d$. Note that, in general, the diffusely scattered light is not centered about the direction of specular reflection. For example, in the limit where the diffusion is Lambertian, the reflected rays are centered about the mirror's normal regardless of the angle of incidence. Accordingly, $\theta_d$ is merely an approximate measure of the angular breadth of the diffuse reflection.

Upon reflection at the surface of the diffusive mirror 240, some of the emitted light 260 that would remain within the luminescent layer 110 if specularly reflected will instead be reflected at an angle less than the critical angle ($\theta_c$), allowing it to pass into the region with the lower index of refraction. Note that a smaller difference between $n_{high}$ and $n_{low}$ results in a larger critical angle, thereby increasing the fraction of light incident on the interface that escapes to the lower index region. At the same time, some of the emitted light 270 that would escape upon specular reflection will instead be directed into a waveguide mode. However, if self-absorption of the emitted light is low and the reflectivity of the diffusive mirror 240 is high, a large fraction of the emitted light will eventually be coupled out of the pixel 200 after multiple reflections from the diffusive reflector 240 even if there is a large discontinuity between the indices of refraction, $n_{high}$ and $n_{low}$.

Figure 6:
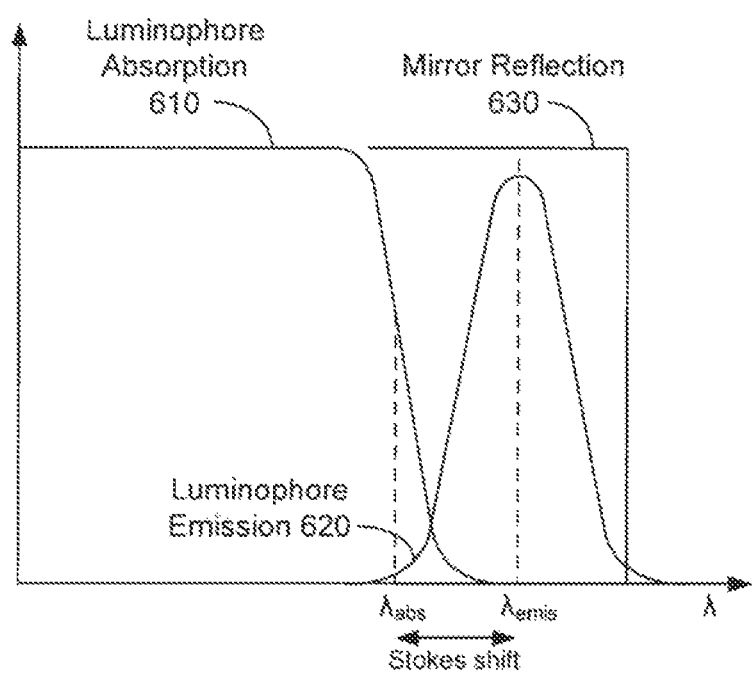
FIG. 6 illustrates an exemplary reflectivity of a diffusive mirror of the luminescence-based reflective pixels (or subpixels) of FIG. 2 with respect to the wavelength of the incident light and the resulting emission in accordance with various embodiments of the present disclosure.

In some embodiments, it is desirable for the diffusive mirror 240 to reflect some wavelengths of ambient light that are not absorbed by the luminophores but which contribute to the pixel's 200 (or sub-pixel's) desired color, in addition to reflecting the wavelengths emitted by the luminophores 120. For example, L*, the lightness as defined in the 1976 color space of the International Commission on Illumination (CIE), of the pixel 200 may be improved if wavelengths of light in a range somewhat longer than the absorption cutoff of the luminophores 120 are reflected. FIG. 6 illustrates an exemplary relationship between the absorption band 610 and the emission band 620 of the luminophores as a function of wavelength. As shown in FIG. 6, the luminophores absorb light with wavelengths up to an absorption edge, $\lambda_{abs}$. A substantial fraction of the absorbed energy will be re-radiated by the luminophores in a band around an emission wavelength, $\lambda_{emis}$, that is longer than the absorption edge. The diffusive mirror 240 also reflects wavelengths of ambient light within the desired color band 630. Additionally, the functional form of the scattering distribution with respect to angle may be tailored by engineering the distribution of feature shapes and sizes on the diffusive mirror 240.

Using a diffusive mirror 240 with a larger characteristic scattering angle $\theta_d$ will increase the fraction of ambient light that is scattered into waveguide modes rather than directly reflected. However, up to a point, a larger characteristic $\theta_d$ may also decrease, on average, the number of times light in waveguide modes must be scattered before being deflected into an angular range that allows it to escape the high index region(s), e.g. the luminescent layer 110. Decreasing the distance that light of wavelengths that contribute to the desired color travels in the high index region(s) minimizes the absorption of this light. Thus, in choosing the desired angular scattering range $\theta_d$ there is a trade-off between minimizing the amount of ambient light, at wavelengths which should be returned to the viewer, that is scattered into waveguide modes and minimizing both the distance ambient and luminescent light trapped in waveguide modes travels before being scattered out of the high index region(s) and the number of reflections required to accomplish this.

The characteristic angular scattering range of the diffusive mirror 240, which is characterized by the scattering angle $\theta_d$, may be selected based upon the mean free path for absorption of light at wavelengths that are to be returned to the viewer, the reflectivity of the diffusive mirror 240, the indices of refraction of the device layers, and the relative contribution of the luminescent emitted light and directly reflected ambient wavelengths to the perceived lightness of the desired color. For instance, in designs where the lightness of the pixel 200 is dominated by directly reflected ambient light, it may be desirable for the scattering angle $\theta_d$ to be small, such that the reflection is closer to specular, so as to minimize the fraction of ambient light that is scattered into waveguide modes. On the other hand, broad scattering, tending toward Lambertian, is preferred in the limit where the apparent lightness of the pixel 200 is dominated by luminescent emission. This may be the case, for example, when the luminophores absorb over a broad range of the visible spectrum and emit efficiently in the red portion of the spectrum, so that a large fraction of the incident optical spectrum is converted to luminescence. In intermediate situations, where both the reflected ambient and luminescent light are important, the characteristic scattering angle that optimizes the pixel's 200 apparent lightness is determined, in part, by the critical angle ($\theta_c$) for total internal reflection at the high index region's interfaces, the reflectivity of the diffusive mirror 240, and the optical absorptivity of the waveguide materials.

Figure 3:
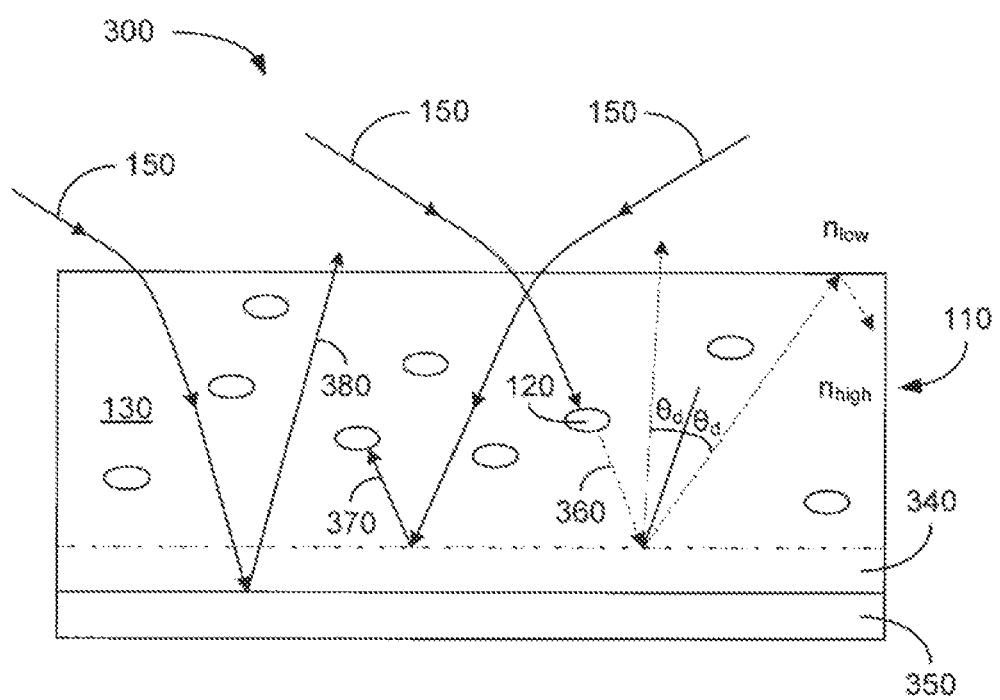

In addition, the tradeoff between out coupling the emitted light and directly reflecting some wavelengths of ambient light can be mitigated by creating a diffusive mirror 240 whose characteristic scattering angle is wavelength dependent. In one embodiment, among others, stacking a diffusive mirror that reflects only selected wavelengths of light over a specular mirror that reflects at least the wavelengths not reflected by the diffusive mirror 240 may be utilized. FIG. 3 is a graphical representation of a luminescence-based reflective pixel (or subpixel) 300 including a diffusive mirror 340 and a mirror 350 that is specular or nearly specular in accordance with an embodiment of the present disclosure. Wavelength selective diffuse mirrors 340 may be created, for example, by layering a Bragg stack over a textured surface. The diffusive mirror 340 may be configured to diffusively reflect the light 360 having wavelengths emitted by the luminophores 120, so as to aid in scattering them out of the high index region(s), e.g. the luminescent layer 110, and be essentially transparent and relatively non-scattering at other wavelengths. In some embodiments, it may be desirable to configure this diffusive mirror 340 to also diffusively reflect incident light 370 having wavelengths which are to be absorbed by the luminophores 120 or by any sensitizers used to collect some portion of the ambient spectrum. This may aid the absorption of these wavelengths by increasing their effective path length in the layer 130. The specular or nearly specular mirror 350 is used to reflect light 380 having wavelengths not reflected by the diffusive mirror 340. Thus, for example, ambient light at wavelengths that are not absorbed by the luminophores 120, nor emitted by the lumophores 120, and that contribute to the color one wishes the pixel to produce, can be immediately reflected out of the high index region, e.g. the luminescent layer 110, without being temporarily trapped within it and subject to additional absorption. If desired, mirror 350 can achieve wavelength selectivity by, for example, comprising a color filter material(s) over a broadband specular or nearly specular mirror.

Alternatively, a mirror with wavelength-dependent diffusivity may be created by stacking a wavelength-selective specular, or less diffusive, mirror over a more diffusive mirror. In this case, the less diffusive mirror would be reasonably transparent to wavelengths not reflected by the less diffusive mirror.

Figure 4:
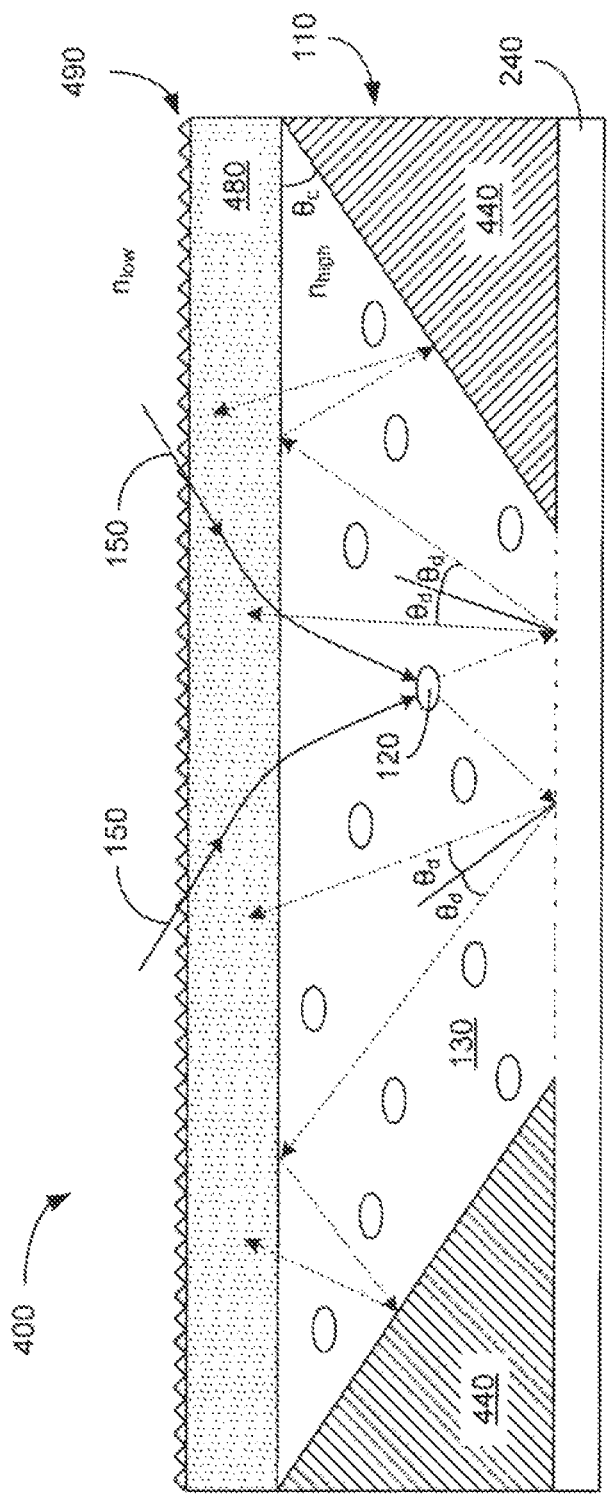

In some embodiments, an optical shutter such as a dichroic guest-host system or opaque-to-clear electrophoretic cell may be positioned above (or in front of) the luminescent layer 110 so as to gate either the incident ambient light or the light emitted by the luminophores 120. FIG. 4 is a graphical representation of a luminescence-based reflective pixel (or subpixel) 400 including an optical shutter 480 in accordance with an embodiment of the present disclosure. The shutter 480 forms the top layer of the pixel 400, and ambient light 150 for illumination enters the pixel 400 through the shutter 480. The shutter 480 has a light transmission that is adjustable. The shutter 480 modulates the intensity of ambient light 150 entering the luminescent layer 110 and also the light leaving the pixel 400. In this way, the shutter 480 controls the amount of light produced by the pixel 400 to achieve the desired brightness. If a dichroic system is used, in some embodiments, a quarter-wave plate may be disposed between the dichroic shutter and the luminescent layer 110 to allow modulation of both polarizations of ambient light. In other embodiments, the quarter-wave plate may be located at other locations between the dichroic shutter and the mirror 240.

As illustrated in FIG. 4, side reflectors 440 may also be included in the pixel 400. The use of tilted side reflectors 440 can help to out-couple light that reaches the edges of the pixel 400. The benefit of these side reflectors 440 is most appreciable when the in-plane dimensions of the pixel 400 are not large relative to the lateral distances over which the light in a waveguide mode propagates and the additional in-coupling of ambient wavelengths is not problematic. The tilt angle of the side reflectors may be in a range about the critical angle $\theta_c$, which is the mirror angle that re-directs the largest fraction of this light out of the pixel 300. In some embodiments, the tilt angle is in the range of about $\theta_c \pm 45$ degrees, about $\theta_c \pm 30$ degrees, or about $\theta_c \pm 10$ degrees.

Figure 5:
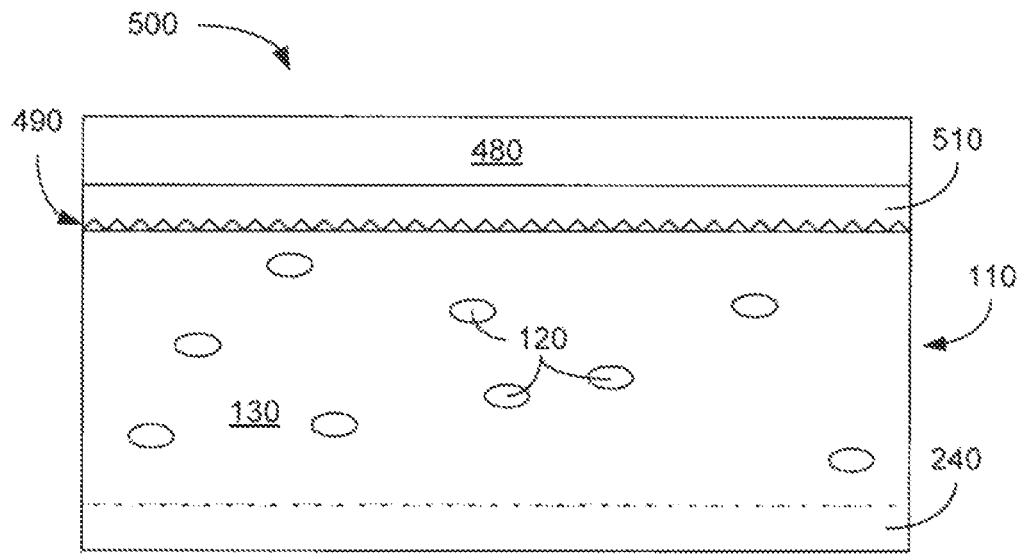

In some embodiments, a low index layer may be included between the optical shutter and the high index layer (e.g., luminescent layer 110). FIG. 5 is a graphical representation of a luminescence-based reflective pixel (or subpixel) 500 including a low index layer 510 between the optical shutter 480 and the luminescent layer 110 in accordance with an embodiment of the present disclosure. The low index layer 510 may comprise low index polymers, sol-gels, or an air gap including spacers positioned between the shutter 480 and the luminescent layer 110 to maintain proper spacing. This may be beneficial because when light that escapes to the low index layer subsequently passes into the shutter 480 it will be partially collimated within the shutter 480 if the index of the shutter 480 is larger than that of the low index region 410. The greater the difference in index of the low index layer 510 and the shutter 480, the greater will be the collimation. The open-closed transparency ratio of some optical shutters 480, such as dichroic guest-host systems, can be significantly improved if the light they are modulating is partially collimated as it passes through them. In addition, the low index layer helps to prevent the trapping of outwardly bound light within waveguide modes in the shutter. In the limit where the low index region is an air gap, the majority of the light that escapes the luminescent layer into the air gap and then passes through the shutter will subsequently approach the top surface of the shutter at an angle below the angle for total internal reflection, assuming there is minimal optical scattering within the shutter. Thus, introducing the air gap will greatly reduce the amount of light trapped in waveguide modes within the shutter, where most of it would be absorbed. Similarly, introducing a low index layer 510 will minimize light lost in waveguide modes within the shutter if the index of the low index layer 510 is close to that of the region above the top surface of the shutter (typically air).

To further improve the out-coupling efficiency, layers with an intermediate refractive index, graded index, or moth-eye structures 490 can be included either on top of the shutter 480 (as depicted in FIG. 4) or above the luminescent layer 110 (as depicted in FIG. 5). To reduce stray reflections and further improve the light out-coupling, additional graded index, motheye, or intermediate refractive index layers may be included between the shutter 480 and the low index layer 510.

While the exemplary embodiments of FIGS. 1-5 depict a single luminescent layer 110, in other embodiments multiple layers with different indices of refraction may be utilized. For example, a transparent spacer layer (not shown) may be used between the luminescent layer 110 and the diffusive mirror 240. This may be desirable if the material of the mirror 240 tends to quench the luminescence in the luminescent layer 110. It also may be desirable when one wants to use a luminophore 120 that is not easily dispersible in a transparent matrix 130 while maintaining a high internal emission efficiency. In some cases, the luminescent layer 110 may comprise multiple transparent matrix layers, each containing different luminophores 120. This may be desirable when there is no single transparent matrix material 130 in which all the desired luminophores 120 can be dispersed without aggregation. Aggregation of luminophores is known to often cause decreased luminescent emission efficiency through concentration quenching effects. In other cases, it may be desirable to include a transparent matrix layer that forms a portion of a high index region (e.g., as part of a stack of layers that form the high index region) in which the light is temporarily guided in a waveguide mode. This can be beneficial, for example, in increasing the thickness of the high index region in cases where the transparent matrix layer containing the luminophores 120 is thin relative to the wavelength of the guided light. Adding an additional transparent matrix layer allows light to move laterally in waveguide modes so that its direction of propagation can be randomized by different portions of the diffusive reflector 240.

Figure 7:
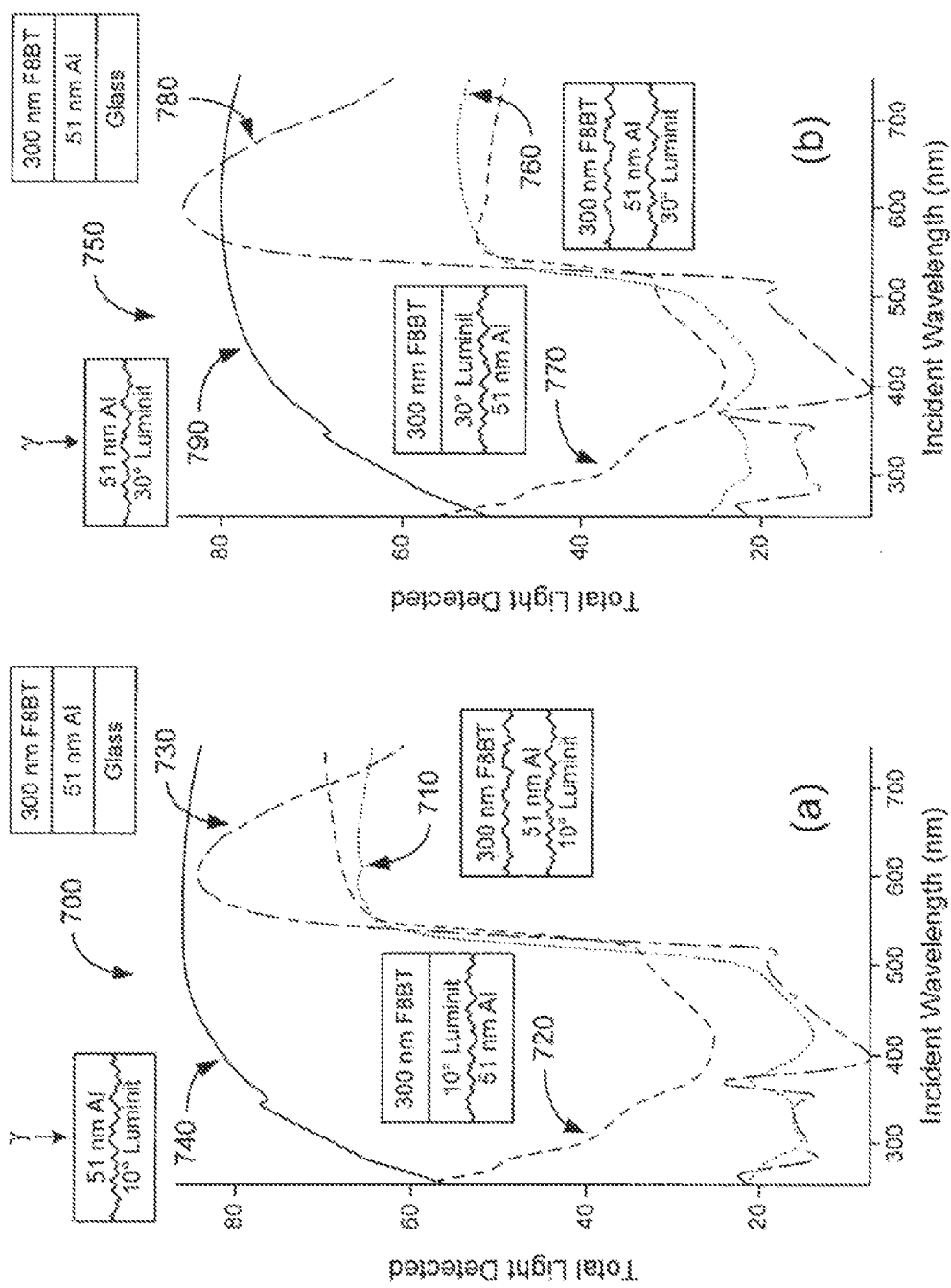
FIG. 7 illustrates the effectiveness of the luminescence-based reflective pixels (or subpixels) of FIG. 2 in accordance with various embodiments of the present disclosure.

FIG. 7 illustrates the effectiveness of including a diffusive mirror 240 behind (or below) the luminescent layer 110. In the embodiments of FIG. 7, a 300 nm film of the photoluminescent polymer F8BT was deposited on various specular and diffusive mirrored surfaces. F8BT emits in the red portion of the spectrum with an internal luminescent emission efficiency in thin film form of 50-58%. FIGS. 7(a) and 7(b) illustrate the effect of a diffusive surface with a scattering half-angle $\theta_d$ of about 10 degrees and about 30 degrees, respectively. While the scattering half-angle can range from zero to 90 degrees, in some embodiments, the scattering half-angle is in the range of about 10 degrees to about 50 degrees, about 10 degrees to about 30 degrees, or about 20 degrees to about 30 degrees. The total light returned by each sample surface was measured as a function of excitation wavelength using an integrating sphere. The "total light" signal plotted in FIGS. 7(a) and 7(b) is an uncalibrated weighted average over the wavelength detection range of the detector, which includes all visible light.

With respect to FIG. 7(a), graphical plot 700 summarizes the total light returned from the F8BT film deposited on diffusive mirrors with a scattering half-angle of about 10 degrees. A 100 µm thick polycarbonate film substrate (n=1.58) from Luminit was used to provide a rough, diffusive surface with $\theta_d$ of about 10 degrees. The rough side of the substrate was coated with a 51 nm aluminum (Al) film. In one embodiment, measurements were taken with the F8BT film spin-cast on the rough aluminized surface (plot 710). In another embodiment, measurements were taken with the F8BT film spin-cast on the back (smooth) side of the polycarbonate substrate (plot 720). For comparison, measurements were taken of a specular mirrored surface with the F8BT film spin-cast on a 51 nm thick Al film disposed on a smooth glass substrate (plot 730). A reference sample of the rough aluminized substrate without the F8BT film was also measured (plot 740).

With respect to FIG. 7(*b*), graphical plot 750 summarizes the total light returned from the F8BT film deposited on diffusive mirrors with a scattering half-angle of about 30 degrees. A 100 µm thick polycarbonate film substrate (n=1.58) from Luminit was used to provide a rough, diffusive surface with $\theta_d$ of about 30 degrees. The rough side of the substrate was coated with a 51 nm aluminum (Al) film. In one embodiment, measurements were taken with the F8BT film spin-cast on the rough aluminized surface (plot 760). In another embodiment, measurements were taken with the F8BT film spin-cast on the back (smooth) side of the polycarbonate substrate (plot 770). For comparison, measurements were taken of a specular mirrored surface with the F8BT film spin-cast on a 51 nm thick Al film disposed on a smooth glass substrate (plot 780). A reference sample of the rough aluminized substrate without the F8BT film was also measured (plot 790).

One feature illustrated by the spectra plots 710-730 and 760-780 is the total light returned from the embodiments when stimulated by light in the range of about 400-500 nm. This is a region of strong absorption by the F8BT film. The 300 nm F8BT films used in the measurements have an optical density significantly greater than one in this range, so that almost all of the incident light is absorbed by the F8BT film. Thus, the light detected in this frequency range comes almost entirely from luminescent light.

When compared to the total light returned by the F8BT film on a specular mirrored surface (730), the measurements (710) indicate that the light coupled out of the device in the range of about 400-500 nm is slightly improved with the F8BT film disposed on the rough aluminized surface with a scattering half-angle of about 10 degrees. When the F8BT film is placed on the smooth backside of the polycarbonate substrate with a scattering half-angle of about 10 degrees, the detected improvement (720) is significantly greater. This is likely due to the benefit of the thicker effective waveguide provided by the polycarbonate substrate layer being located between the F8BT film and the diffusively reflecting textured Al layer. When the waveguide is restricted to the 300 nm F8BT the light must interact with the mirrored surface many times before propagating far enough laterally to be coupled out of the waveguide mode. Note that the in-plane length scale of the characteristic roughness of these mirrors is many microns. The reflectivity of the 51 nm Al film is only approximately 80-85% in the 400-500 nm band (740 and 790), so multiple reflections while propagating laterally in a waveguide mode quickly diminish the light's intensity. Other reflective films may be utilized to improve reflectivity such as, but not limited to, silver (Ag) and gold (Au). For example, a 200 nm film of Ag may be disposed on one side of the polycarbonate substrate.

In the case of both diffusive embodiments with $\theta_d$ of about 30 degrees (760 and 770), the out-coupled luminescence detected within the range of about 400-500 nm is significantly greater than that detected for embodiments utilizing specular mirrors (780). The wider diffusion half-angle may allow the luminescent light to be out-coupled with fewer interactions with the mirrored surface. These measured results suggest that the out-coupling can be improved (e.g., by a factor of at least two) by incorporating diffusive mirrors.

FIG. 7 also shows that the use of diffusive mirrors will tend to decrease the fraction of incident light that is reflected at wavelengths not absorbed by the luminophores (wavelengths of about 560 nm and greater in the case of the F8BT film). This effect is illustrated by the difference in measurements of the specular surface (730 and 780) and measurements of the diffusive surfaces (710-720 and 760-770, respectively). Some of the light that would otherwise be specularly reflected is coupled into a waveguide mode, with a portion of this light being absorbed. At some wavelengths, this can be beneficial. For example, if one wanted to create a green sub-pixel using luminophores that emit primarily at 550 nm then one would prefer not to return wavelengths longer than about 590 nm (depending on the desired color saturation). On the other hand, it is desirable to return light close to the emitted wavelength (550 nm in this example) that is not absorbed by the luminophores. If the reflectivity of the diffusive mirror is high at these wavelengths, then a large fraction of the incident light that is coupled into the waveguide at these wavelengths will be returned and there will be a net benefit in using the diffusive mirror.

Similar measurements have been made on devices comprising a layer of polymethylmethacrylate (PMMA) having a thickness of about 10 microns and containing a number of luminescent dyes. The PMMA layer was deposited on a 300 nm thick silver layer that was, in turn deposited on the diffusive surface of a 30 degree Luminit diffuser. The dyes were chosen such that light energy absorbed by a higher energy dye is transferred to a lower energy dye. This energy transfer may be accomplished by choosing dyes where the photoluminescent emission wavelength band of the higher energy dye overlaps with the light absorption wavelength band of the lower energy dye. A physical mechanism that can be used to facilitate this energy transfer is known as Förster Exchange. Using this mechanism, ambient light can be absorbed over a wide wavelength range and transferred to a final lowest energy dye from whence it is emitted via photoluminescence. Measurements on the devices indicate that, by using a luminescent film over an appropriately diffusive mirror with high reflectivity, one can get apparent reflectivities in excess of 200% within the emissive wavelength band of the lowest energy photoluminescent emitter. Most importantly, this system provides measured lightness values, L*, that exceed those possible with theoretically perfect reflective surfaces combined with ideal color filters with the same CIE a* and b* color coordinates. Accordingly, a luminescent film configured with a sufficiently reflective and appropriately diffuse mirror, as described here, may provide a beneficial tradeoff between improved out-coupling of luminescent light and increased in-coupling of ambient wavelengths that are within the wavelength band that should be returned to the viewer to provide the desired color.

Figure 8:
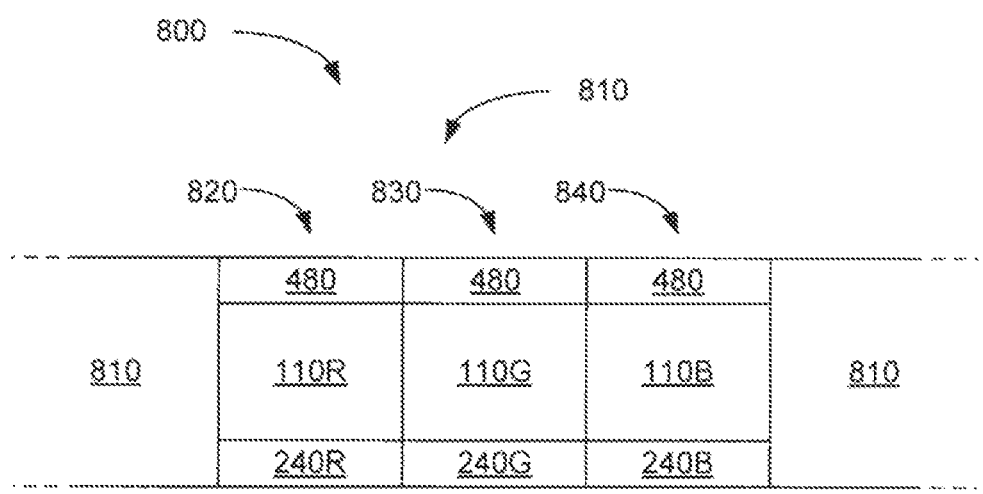
FIG. 8 is a graphical representation of a pixel 810 with side-by-side luminescence-based reflective sub-pixels 820, 830, and 840 in accordance with one embodiment of the present disclosure.

Reflective displays (e.g., e-paper technology) can include arrays of luminescence-based reflective pixels 810 that control the return of light back to a viewer. In some embodiments, a pixel may include three subpixels in a side-by-side arrangement for modulating three primary colors to provide a wide color gamut. FIG. 8 is a graphical representation of a pixel 810 with side-by-side luminescence-based reflective sub-pixels 820, 830, and 840 in accordance with one embodiment of the present disclosure. In the exemplary embodiment of FIG. 8, each sub-pixel 820, 830, and 840 includes an optical shutter 480, a luminescent layer 110R, 110G, and 110B, respectively, and a diffusive mirror 240R, 240G, and 240B, respectively.

The diffusive mirrors 240R, 240G, and 240B may reflect over different wavelength bands. For example, this may be accomplished by using color filters over broadband diffusive mirrors or by layering Bragg stacks over a textured (diffusive) surface, which provide wavelength selective mirrors. Alternatively, a fourth white subpixel may also be included. In some embodiments, sub-pixels 820, 830, and 840 may also include side reflectors 440.

Therefore, at least the following is claimed:

1. A luminescent-based pixel, comprising:
  a luminescent layer including luminophores distributed in a matrix, the luminescent layer configured to receive light from an ambient environment through a first side of the luminescent layer, the luminescent layer having an index of refraction that is higher than an index of refraction of the ambient environment; and
  a diffusive mirror adjacent to a second side of the luminescent layer, the second side opposite the first side of the luminescent layer, the diffusive mirror configured to reflect incident light within a predefined scattering half-angle.

2. A luminescent-based pixel as in claim 1, wherein the predefined scattering half-angle is in the range of about 10 degrees to about 30 degrees.

3. A luminescent-based pixel as in claim 1, wherein the diffusive mirror is wavelength selective.

4. A luminescent-based pixel, comprising:
  a luminescent layer including luminophores distributed in a matrix, the luminescent layer configured to receive light from an ambient environment through a first side of the luminescent layer, the luminescent layer having an index of refraction that is higher than an index of refraction of the ambient environment, the first side of the luminescent layer configured to diffuse internally reflected light; and
  a mirror disposed on a second side of the luminescent layer, the second side opposite the first side of the luminescent layer;
  wherein the mirror reflects light at a scattering angle that is wavelength-dependent.

5. A luminescent-based pixel as in claim 4, further comprising at least one side reflector in the luminescent layer.

6. A luminescent-based pixel as in claim 5, wherein a tilt angle of the at least one side reflector is in the range of about ±30 degrees of a critical angle of the luminescent layer.

7. A luminescent-based pixel as in claim 4, further comprising an optical shutter disposed on the first side of the luminescent layer.

8. A luminescent-based pixel as in claim 7, wherein the optical shutter is a dichroic guest-host system.

9. A luminescent-based pixel as in claim 7, further comprising a low index layer between the luminescent layer and the optical shutter.

10. A luminescent-based pixel as in claim 9, wherein the low index layer is an air gap.

11. A luminescent-based pixel as in claim 7, further comprising a graded index structure between the luminescent layer and the optical shutter.

12. A luminescent-based pixel as in claim 4, wherein the luminescent layer comprises a plurality of physical layers, each physical layer having an index of refraction different than the adjacent physical layer.

13. A reflective display device comprising a plurality of the luminescent-based pixels as in claim 4.

14. A reflective display pixel comprising
  a plurality of luminescent-based subpixels, each subpixel configured to modulate the return of a primary color, each subpixel comprising:
    a luminescent layer including luminophores distributed in a matrix, the luminescent layer configured to receive light from an ambient environment through a first side of the luminescent layer;
    a mirror adjacent to a second side of the luminescent layer, the second side opposite the first side of the luminescent layer, the diffusive mirror configured to reflect incident light within a predefined scattering half-angle; and
    an optical shutter disposed on the first side of the luminescent layer, the optical shutter configured to modulate an intensity of light coupled out of the subpixel.

15. The reflective display pixel of claim 14, wherein each subpixel further comprises at least one side reflector in the luminescent layer.

16. The reflective display pixel of claim 14, wherein each subpixel further comprises a low index layer between the luminescent layer and the optical shutter.

17. A luminescent-based pixel as in claim 1, wherein the diffusive mirror adjacent to the second side of the luminescent layer has a mirror surface in contact with the second side of the luminescent layer.

18. A luminescent-based pixel as in claim 1, wherein the diffusive mirror adjacent to the second side of the luminescent layer reflects light emitted by the luminophores directly back into the luminescent layer.

19. A reflective display pixel as in claim 14, wherein the mirror adjacent to the second side of the luminescent layer reflects light emitted by the luminophores directly back into the luminescent layer.

20. A reflective display pixel as in claim 14, wherein the mirror adjacent to the second side of the luminescent layer reflects ambient light from the luminescent layer not absorbed by the luminophores directly back into the luminescent layer.

* * * * *